United States Patent [19]
Greenberg et al.

[11] 3,992,786
[45] Nov. 23, 1976

[54] APPARATUS FOR SEQUENCE TRAINING

[75] Inventors: Samuel J. Greenberg, Douglaston; Marvin P. Fischthal, Smithtown; Elliot E. Blond, Amityville; Roger A. Schaefer, Centereach, all of N.Y.

[73] Assignee: Grumman Aerospace Corporation, Bethpage, N.Y.

[22] Filed: Feb. 5, 1975

[21] Appl. No.: 547,352

[52] U.S. Cl. .................................. 35/9 R; 35/10; 35/12 F
[51] Int. Cl.² .......................................... G09B 9/08
[58] Field of Search ............... 35/6, 8 R, 9 R, 9 A, 35/10, 11 R, 11 A, 12 B, 12 C, 12 R, 12 F, 12 K, 12 N, 12 W, 19 R, 48 R, 10.2; 235/184, 185

[56] References Cited
UNITED STATES PATENTS

| | | | |
|---|---|---|---|
| 3,154,862 | 11/1964 | Culpepper, Jr. | 35/9 R |
| 3,408,749 | 11/1968 | Brudner | 35/9 A |
| 3,427,732 | 2/1969 | Wopart | 35/11 R X |
| 3,456,363 | 7/1969 | Boxley | 35/10 |
| 3,471,627 | 10/1969 | Ziegler | 35/12 W X |
| 3,500,559 | 3/1970 | Jones et al. | 35/48 R |
| 3,508,346 | 4/1970 | Norman et al. | 35/12 F |
| 3,689,930 | 9/1972 | Strickland | 35/8 R X |
| 3,702,504 | 11/1972 | Cramer | 35/12 W |
| 3,832,790 | 9/1974 | Fryer et al. | 35/10 X |
| 3,836,690 | 9/1974 | Purtle | 35/10.2 |
| 3,894,346 | 7/1975 | Ward et al. | 35/8 R |

*Primary Examiner*—Richard C. Pinkham
*Assistant Examiner*—Vance Y. Hum
*Attorney, Agent, or Firm*—Morgan, Finnegan, Pine, Foley & Lee

[57] ABSTRACT

Apparatus for sequence training including control switches for actuation by an operator, logic circuitry for programming the apparatus to undergo a particular sequence, indicators adjacent the control switches for manifesting the proper control switches to be actuated by the operator, error recognizing circuitry for recognizing improper actuation of the control switches, and a manifesting element responsive to the error recognizing circuitry for manifesting improper actuation of said control switches.

7 Claims, 22 Drawing Figures

TO FIG. 6

APPARATUS FOR SEQUENCE TRAINING

The present invention relates to training apparatus, and more particularly to an apparatus for sequence training.

Various flight instrument trainers are known in the art. Fixed location flight trainers or simulators are disclosed in U.S. Pat. Nos. 2,963,795 (Viehrmann, Jr.); 3.005,267 (Decker); 3,310,883 (Young); 3,513,246 (Fisch et al.); 3,663,734 (Howland et al.), and 3,694,930 (Howland et al.). Such flight trainers of simulators, aside from having a fixed location are rather complex and costly and usually require the use of a computer. Moreover, some of these flight trainers require the presence of an instructor.

Portable flight trainers are also known in the art, see U.S. Pat. Nos. 2,324,833 (Gold); 3,508,346 (Norman et al.), and 3,702,504 (Cramer). Gold discloses a portable cockpit simulator having dials and foot pedals for familiarizing a student with aircraft controls and instruments, and the movements required during actual flight. Norman et al. discloses an audio visual instruction apparatus including an operator's console and student's console with a projector for displaying a series of visual problems at the student's console. The student activates a switch or provides an oral response as appropriate. Cramer discloses a mechanical aircraft instrument operation trainer including pulleys and levers for controlling flight instruments. A recorder is provided to record the course of the aircraft as determined by the response of the operator in control of the trainer.

It is an object of the present invention to provide a dual mode sequence trainer responsive to pre-programmed sequences in which the correct programmed sequence is manifested to the operator (train mode) and errors made by the operator in performing the sequence are displayed and counted (quiz mode).

It is a further object of the present invention to provide a portable sequence trainer which may be used at any remote location.

It is a still further object of the present invention to provide an apparatus for quickly and conveniently enhancing and updating an operator's proficiency in reacting to procedural situations which he may encounter.

It is a still further object of the present invention to provide a compact, sequence trainer that is reliable and easy to program.

Other objects, aspects, and advantages of the present invention will be apparent when the detailed description is considered with the drawing.

Briefly, the apparatus for sequence training includes control means for actuation by an operator, means for programming the apparatus to undergo a particular procedural sequence, means adjacent the control means for manifesting the proper emergency control means to be actuated by the operator, error recognizing means for recognizing improper actuation of the control means, and means responsive to the error recognizing means for manifesting improper actuation of the control means.

Figure 1:
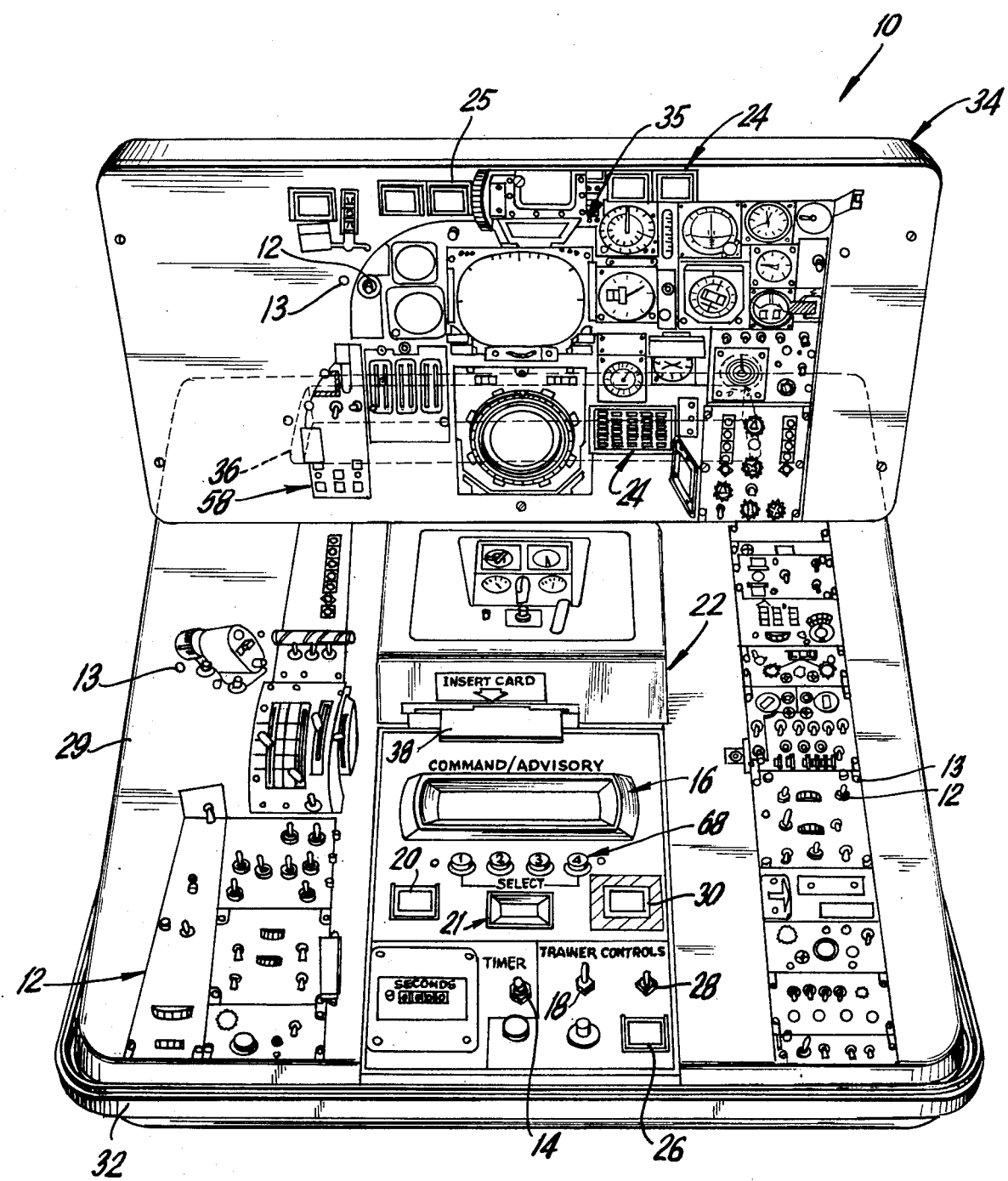
FIG. 1 is a perspective view of one embodiment of the apparatus for sequence training in which the apparatus simulates an instrument panel of an aircraft.

Referring to FIG. 1, the portable sequence training apparatus is illustrated at 10. Although the apparatus 10 is shown as a half scale replica of the control panel of an aircraft, it should be understood that the apparatus 10 may simulate the control panel of a spacecraft, or any other vehicle or system requiring human interfacing with controls. The apparatus 10 includes control switches 12, training lamps 13 adjacent to the control switches, a timer 14, a command/advisory display 16, a mode switch 18, an error light 20, an error counter 21, a card reader 22, caution/warning indicators 24, and a master caution annunciator 25. Also included is a power switch 26, an eject and logic reset switch 28, and an eject lamp 30. The emergency sequence training apparatus 10 is conveniently housed in a suitcase 29 of molded ABS plastic, utilizing photo processed adhesive backed aluminum for the control arrangement, weighing approximately 50 lbs., and operating on 115 volts 50–60 Hz. a.c. The control panel and associated displays are photo-etched, half-size duplicates of the actual cockpit elements.

In operation, the operator (trainee) simply positions the bottom 32 of the suitcase on a suitable surface (not shown) and removes the top (not shown). A hinged flap 34 is pivoted upwardly and locks in a vertical position to expose indicators 35 and control switches 12 of the apparatus 10. a removable power cord (not shown) is stowed in the well 36 under hinged flap 34. The power cord is removed and inserted into a receptacle (not shown) at the rear of the apparatus 10 and the power cord is connected to any 115 volt, 50-50 Hz. a.c. power source. The apparatus 10 is then enabled by depressing the power switch 26. The operator selects the desired mode "train" for teaching a sequence or "quiz" for testing proficiency, by positioning the mode switch 18. A desired sequence for the training or quiz mode is selected from a number of predetermined sequences, e.g., emergency sequences, which are pre-programmed into individual plastic cards 38, e.g., via punched holes; the information on the chosen card 38 is sequentially read by the card reader 22.

Figure 2:
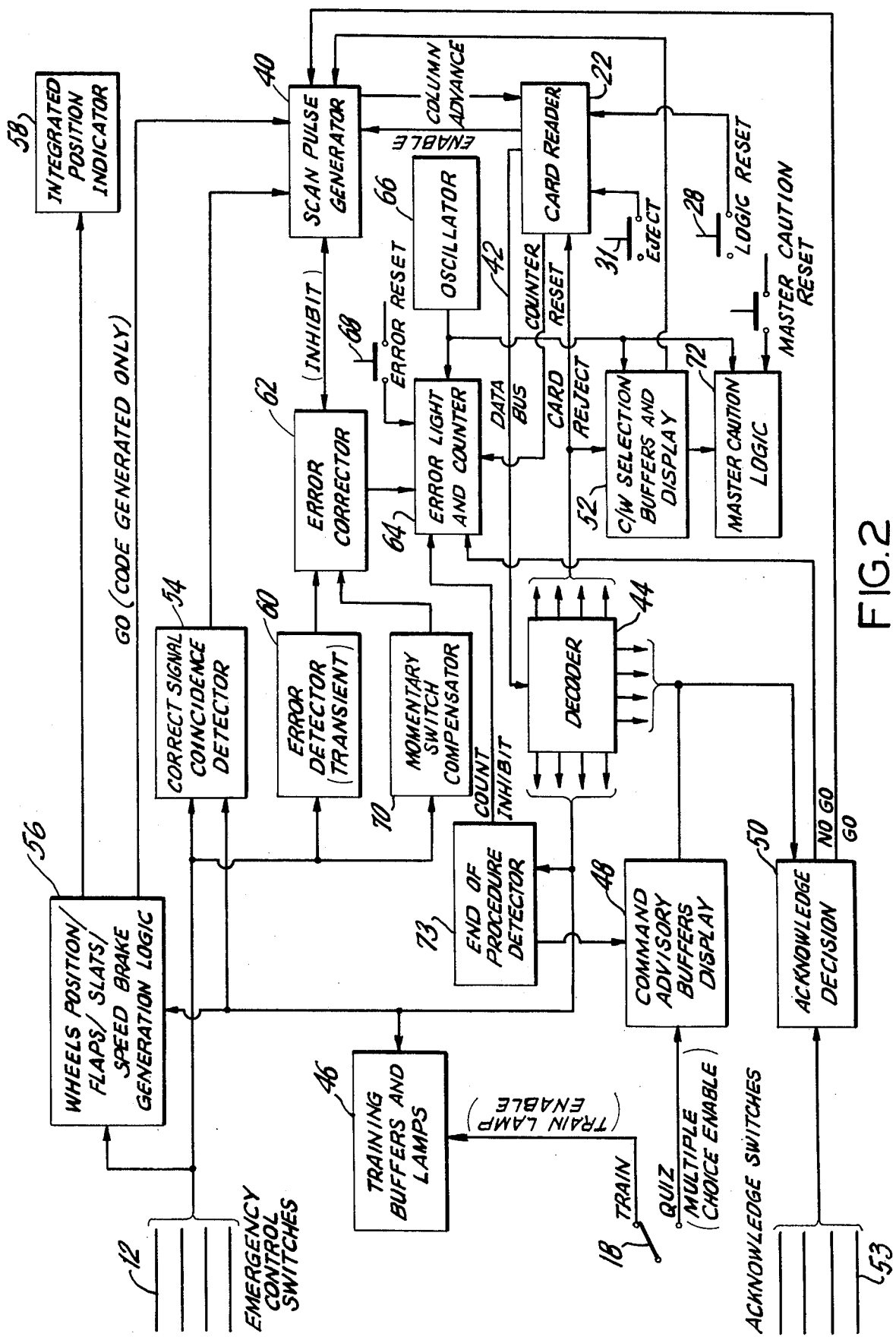
FIG. 2 is a functional block diagram for the electrical system of the present invention.

Referring also to FIG. 2, upon insertion of a chosen card 38 into the card reader 22, an enable signal is fed back to a scan pulse generator 40 to allow scanning of the first column of information on the card 38. The coded data present in the first column is detected by a series of brushes (not shown) that complete an electrical circuit through the punched holes in the card 38 and is then sensed by internal buffers (not shown) for application to a data bus 42. The data bus 42 is electrically coupled to a decoder 44. Such card readers are well known in the art, a suitable card reader 22 for use in the apparatus 10 is available from Hickok of Cleveland, Ohio, as Model 1264A-02 Reader and Model 22 Scanner.

The coded data is transmitted to the decoder 44 which has outputs to all selection dependent means. These selection dependent means include: (a) training buffers and lamps 46, (b) command advisory buffers and displays 48, (c) acknowledge decision logic 50, (d) c/w selection, buffers and displays 52 (e) coincidence detector 54, and (f) wheels position/flaps/ slats/speed brake generation logic 56. If the coded data requires the use of a caution and warning lamp 24, the decoder 44 selects the appropriate function and dictates which caution and warning lamp 24 will be illuminated by transmitting a signal to the c/w selection buffers and display 52. The c/w selection buffers and display 52 will latch the signal, turn on the appropriate lamp 24 and transmit a GO signal to the scan pulse generator 40. If the coded data requires the command-advisory display 16 to be illuminated, the decoder 44 will direct a signal to the proper line of the command/advisory buffers display 48 and the acknowledge decision logic 50.

When the signal is received by the command-advisory buffers display 48, the appropriate buffer is energized and the proper lamp is illuminated. Simultaneously, the signal is received by the acknowledge decision logic 50, which enables the proper line of the acknowlege switches 53 to provide a GO signal. When the proper acknowledge switch 53 is depressed, a GO signal is sent to the scan pulse generator 40. If the coded data requires the use of a control switch 12, the decoder 44 will direct the signal to the training buffers and lamps 46 and the coincidence detector 54.

If the train mode is selected by the mode switch 18, the appropriate training lamp 13 will be selected by the training buffers 46 and illuminated. Simultaneously, the proper switch line is selected in the coincidence detector 54 and if the proper emergency control switch is selected, a GO signal is sent to the scan pulse generator 40. If the coded data requests a specific position of wheels position/flaps/ slats or speed brake, the decoder 44 will address the proper input of the wheels position flaps/slats/speed brake generation logic 56. This generation logic 56 will activate the proper buffers which will drive the integrated position indicator 58. When the appropriate code has been satisfied, the generation logic 56 sends a GO signal to the scan pulse generator 40. The wheels position/flaps/slats/speed brake generation logic 56 is also electrically coupled to the control switches 12. When the generation logic 56 interacts with the control switches 12, a GO signal to the scan pulse generator 40 is not required, since a GO signal is generated in satisfying the coincidence detector 54.

The control switches 12 include two basic classes: (a) Holding, and (b) Momentary. The error circuits must accept an input from either type of switch. Normally, when any control switch 12 is thrown, an error detector 60 is activated. However, if the correct control switch 12 is activated an INHIBIT is sent from the scan pulse generator 40 to an error corrector 62 which negates the signal from the error detector 60. Any other time an error is committed, by activating the wrong holding type switch 12, an error is sensed by the error detector 60 and a pulse is transmitted to the error corrector 62. When the error corrector 62 has been activated, a buffer in the error light and counter 64 is activated which is gated with an oscillator 66. This causes the error light 20 to flash. Simultaneously, a pulse is sent to the error counter 21 and recorded. The error counter 21 is reset by a reset signal from the card reader 22 upon ejection of the card 38. The error light 64 is reset by an error reset switch 68; however, the error light 20 cannot be deactivated until the holding switch 12 which was improperly closed is returned to its original emergency control position. Once the holding control switch 12 is returned to its original position, the error light unit 64 is enabled to accept a reset signal from the error reset 68. The flashing error light 20 is then de-energized.

If any momentary control switch 12 is thrown in error, this is sensed by the error detector 60 and follows the above sequence, except that since a momentary switch 12 is automatically returned to its normal position, a momentary switch compensator 70 is activated. This allows the clearing of the flashing error light 20 upon depression of the error reset 68. This type of error is also committed by the acknowledge switches 53. If the wrong acknowledge switch 54 is depressed the acknowledge decision logic 50 transmits a NO GO signal to the error light and counter 64. The error counter 21 advances by one count and the error light 20 illuminates. Since an independent circuit path is utilized for the NO GO signal, this error can be directly reset by the error reset 68, while the error counter 21 holds the count.

The oscillator 66 is also electrically coupled to master caution logic 72 and the c/w selection buffers and display 52. Certain caution and warning indicators 24 are of the flashing variety; therefore, the oscillator 66 is gated with their buffers so that if they are selected, they will flash when illuminated. The master caution lamp 24 is always a flashing type indicator; therefore, the oscillator 66 is gated with its enabling buffer. The master caution logic 72 senses all c/w selections 52 and enables the master caution lamp 24 any time one of the c/w selections 52 are made. The master caution lamp 24 is extinguished by depressing the master caution reset.

The apparatus 10 functions the same in both the train mode and the quiz mode, except as follows: When the mode switch 18 is placed in the quiz mode, the enable signal to the training buffers and lamps 46 is removed, thereby inhibiting the training lamps 13 from illuminating. Concurrently, a multiple enable signal is transmitted to the command advisory buffers and displays 48 giving the operator a multiple choice (1 of 4) whenever a command code is selected. The decoder 44, upon reading a command code, sends the decoded signal to the command advisory buffers and displays 48 to illuminate the correct display 16 along with three other similar messages in display 16. Thus a multiple choice is presented to the operator. However, only the correct code selection is transmitted to the acknowledgement decision logic 50. Also provided is a timer 14 which may or may not be activated by the operator, as desired, to enable him to determine the amount of time he requires to perform a particular sequence.

When the sequential scanning of the card 38 is completed, an end of procedure detector 73 is enabled. This detector 73 sends an inhibit signal to the error counter 21 so that the operator may reposition the holding control switches without the tabulation of an error. The detector 73 also selects a display via the command advisory buffers and displays 48 to illuminate an end of procedure lamp in the command advisory display 16. If the operator desires to repeat the sequence, he repositions all of the holding control switches 12 and depresses the logic reset switch 28. Depression of the logic reset switch 28 returns the card reader 22 back to the beginning of the particular sequence. If the operator does not desire to repeat the sequence, he acknowledges the end of procedure lamp in the command advisory display 16 in the same manner he would acknowledge any other command advisory display. The acknowledge decision logic 50 then transmits a GO signal to the scan pulse generator 40 which is in turn transmitted to the card reader 22. The programmed card 38 is then ejected from the card reader 22. An overide ejection switch 31 is provided which duplicates the aircraft pilot ejection switch. Since activation of such a switch is final, the card reader 22 is also responsive to the overide ejection switch 31 to eject the card 38.

It should be appreciated that the decoder 44 may include a multiplexing capability and the hardware logic components may be replaced by software. Moreover, the card reader 22, scan pulse generator 40, and program cards 38 may be replaced by a micro-computer, I/O data bus, erasable programmable read only memories, and associated software.

Figure 3:
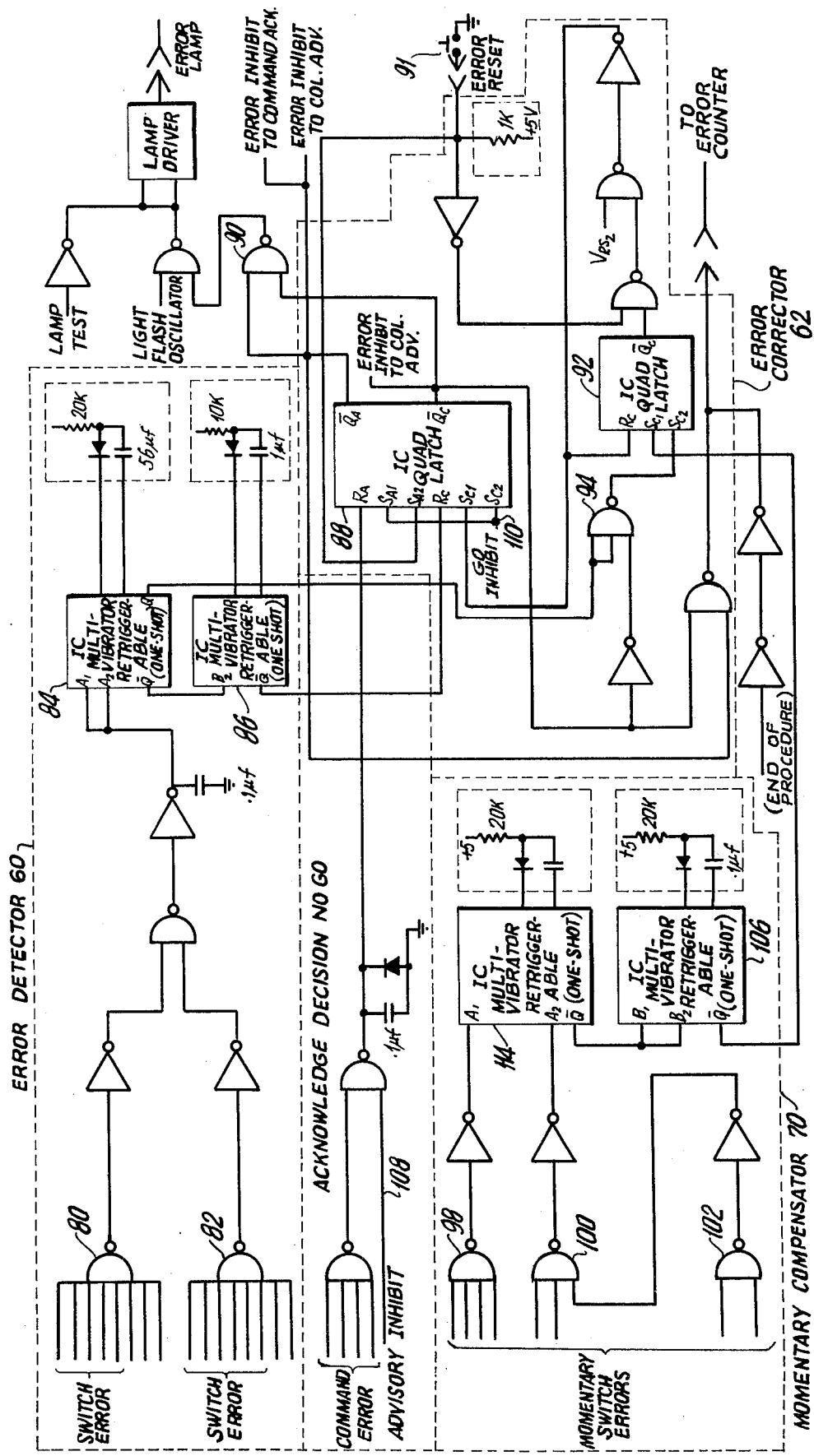
FIGS. 3 and 4 are logic diagrams for the error detection and column advance circuitry, respectively.

A logic diagram of the implementation of the error detector 60, momentary switch compensator 70, error corrector 62, acknowledge decision NO GO, and error light and counter 64 is shown in FIG. 3. The logic elements are represented by conventional symbols and the integrated circuits illustrated by the blocks are commercially available from Texas Instruments, Inc., Dallas, Tex.

Error transient summing is done by the gates 80 and 82. The output of these gates 80 and 82 is transmitted to timing elements 84 and 86. If a true error is present, there is no signal present on the go inhibit line of the quad latch 88 and a pulse from the timing element 86 will set the latch of the quad latch 88. The output of this latch 88 has a dual function.

1. It is detected by gate 90 and enables the error lamp; and
2. It sends an inhibit signal to the scan pulse generator 40 (error inhibit to COL ADV). This latch 88 can be cleared by the error reset switch 91 only after the switch that was thrown in error causing the transient is set back to its original position. This action causes a second transient which is now transmitted to latch 92 since the gate 94 is enabled by the output of latch 88. The output of latch 92 is summed with the error reset switch 91 which is transmitted to the reset inputs of latches 88 and 92. If an error is generated by a momentary switch, the momentary transient detectors 98, 100 and 102 initiate the momentary compensator timing elements 104 and 106. The outputs of these timing elements function the same at latch 92 as the second transient pulse. If an error is generated on the advisory decision no-go line 108, a separate latch is quad latch 88 is activated. The output of this latch 88 is sensed by the same gate 90 that detects other switch errors thus turning on the error lamp and sending a pulse to the error counter. This latch 88 is directly resetable by the error reset switch 91. Since all the switches create transients even when they are correct, an inhibit must be utilized. If the selection was correct, all latches in 88 are inhibited from being set by the go inhibit line 110 initiated by the scan pulse generated by the scan pulse generator 40.

Figure 4:
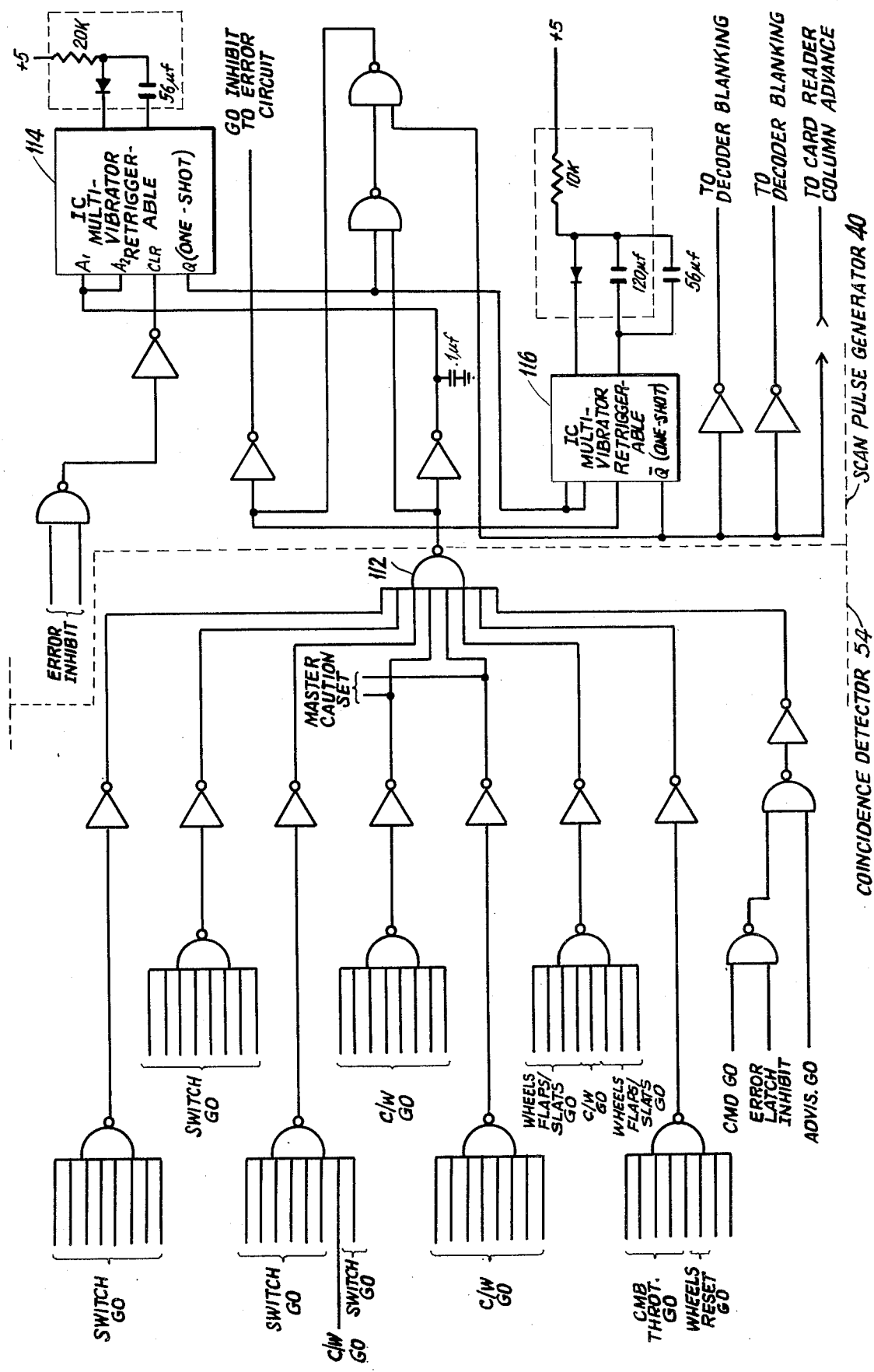
Figure 5:
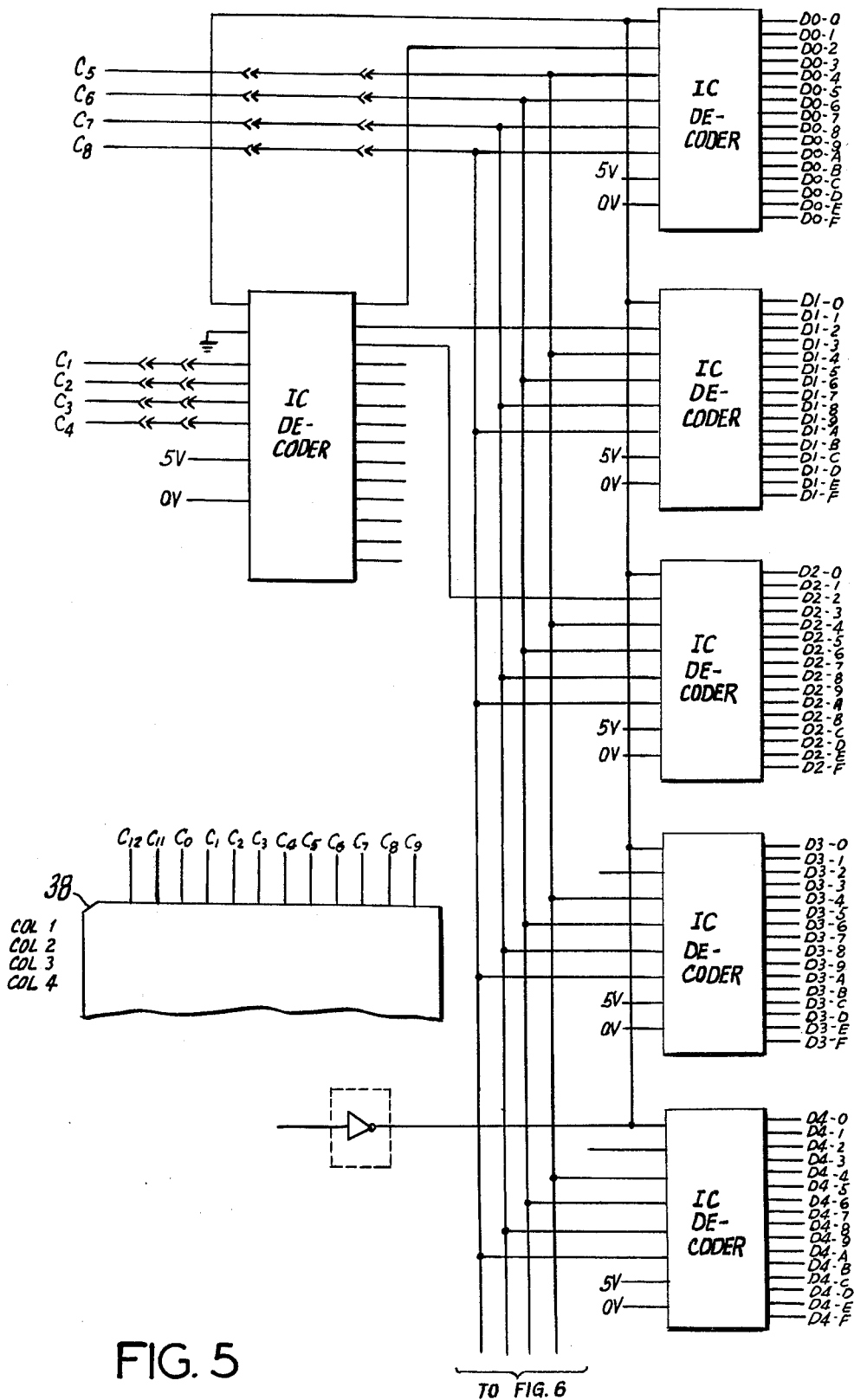
FIGS. 5–22 are diagrams of the electrical circuitry for use in the present invention.
Figure 6:
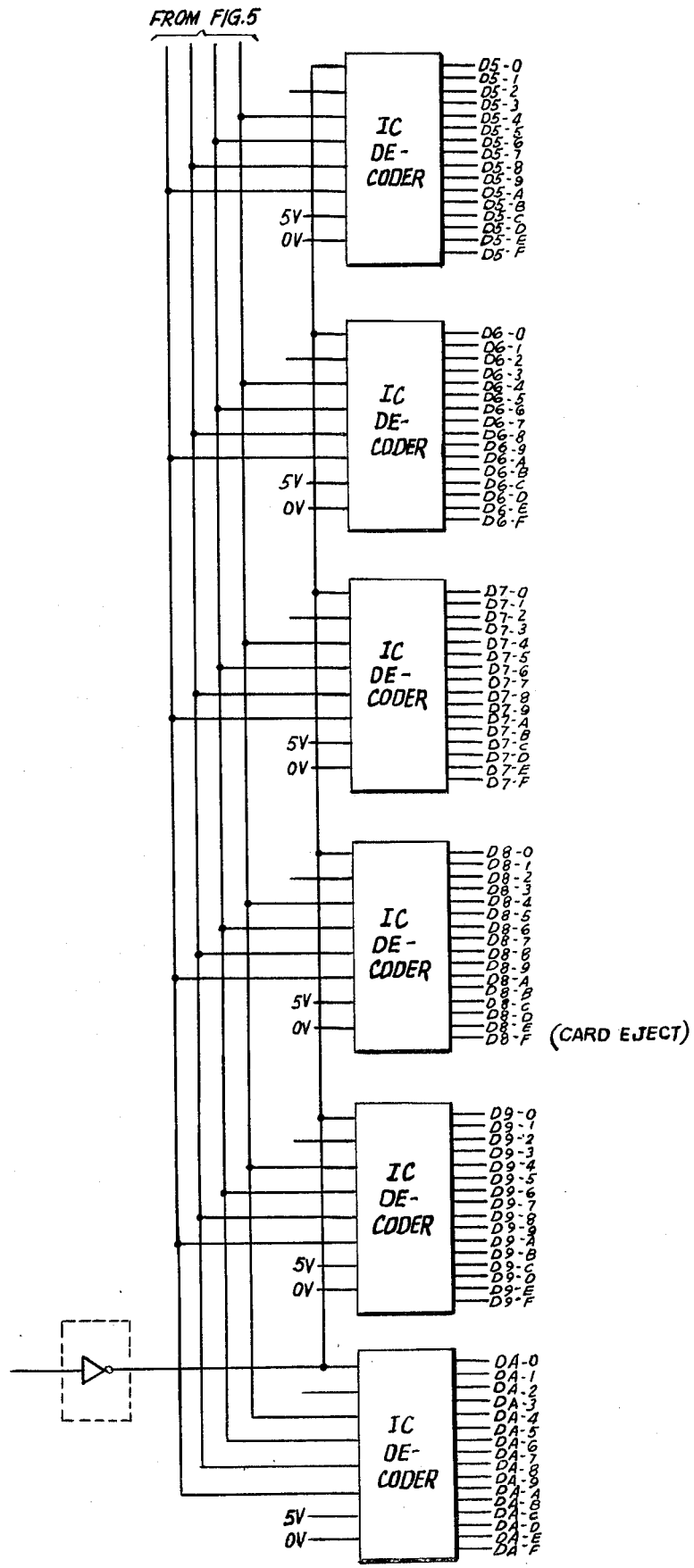
Figure 7:
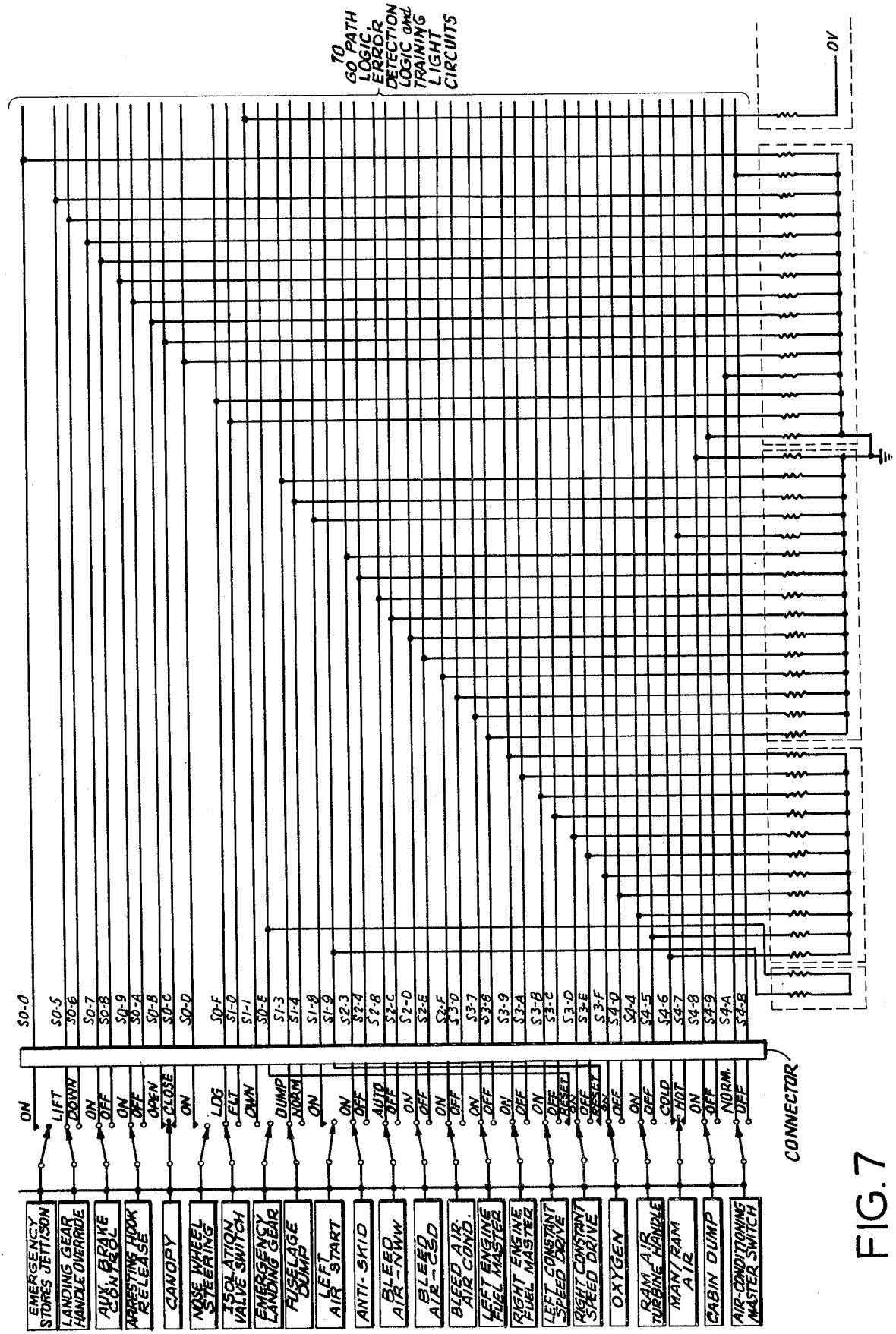
Figure 8:
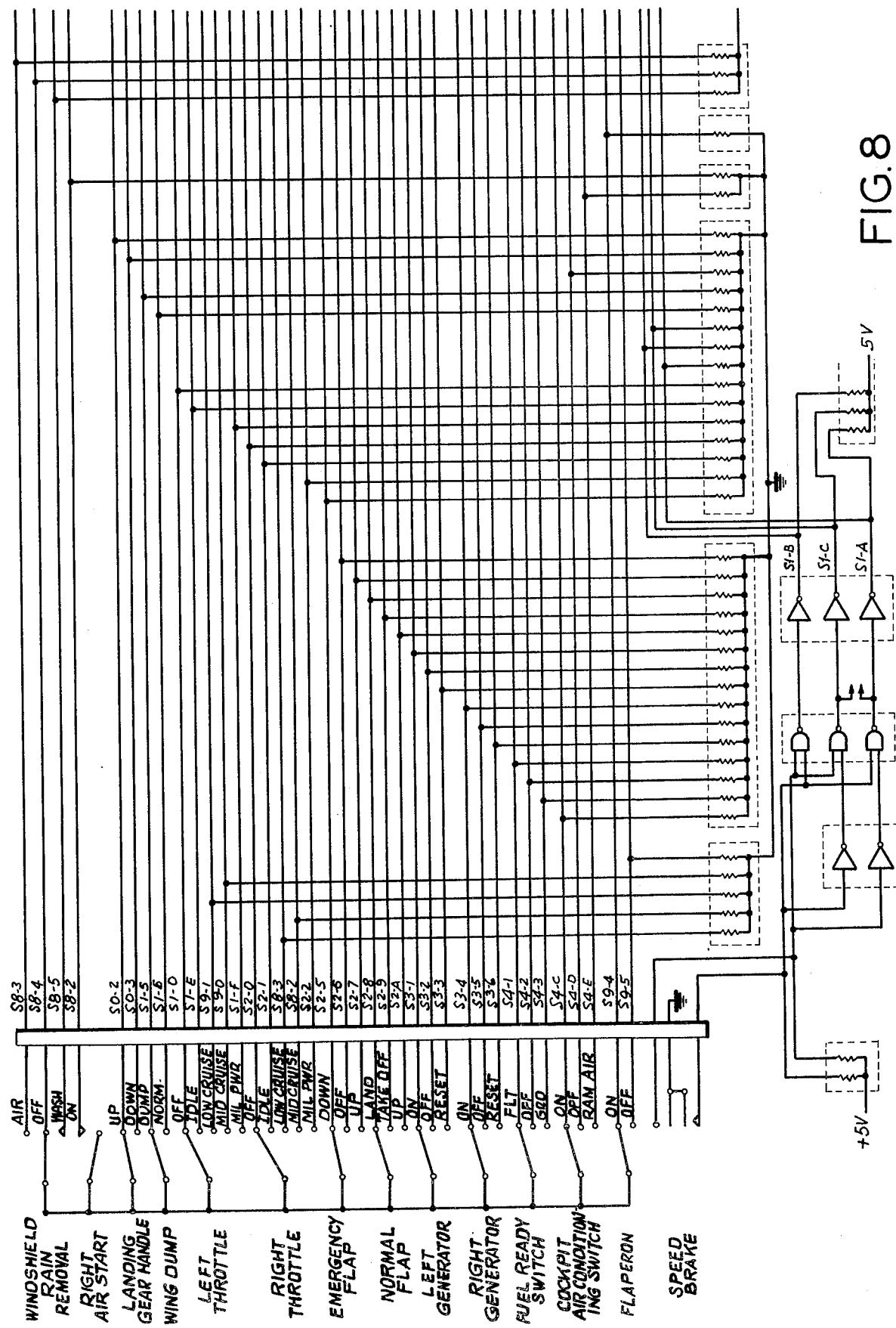
Figure 9:
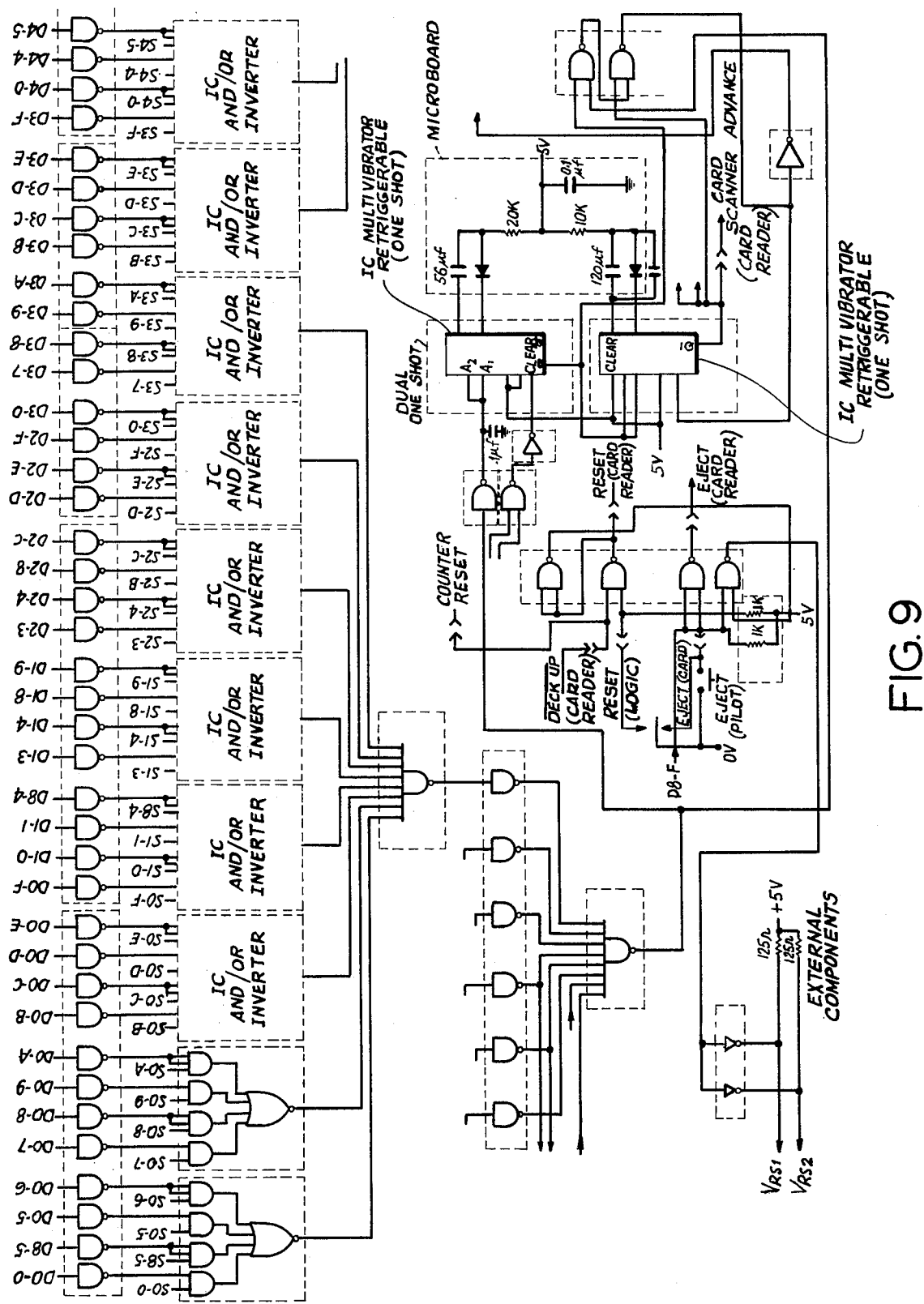
Figure 10:
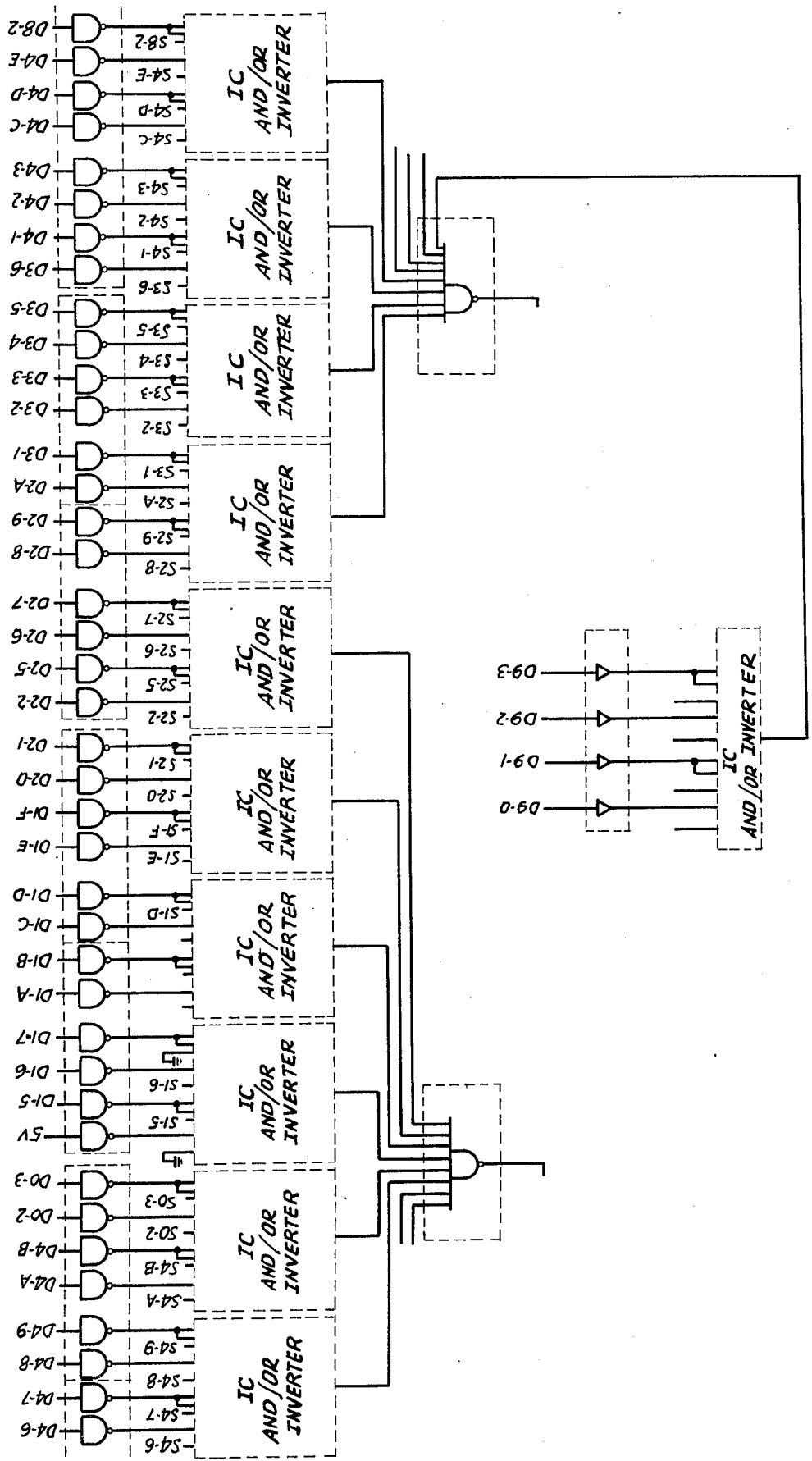
Figure 11:
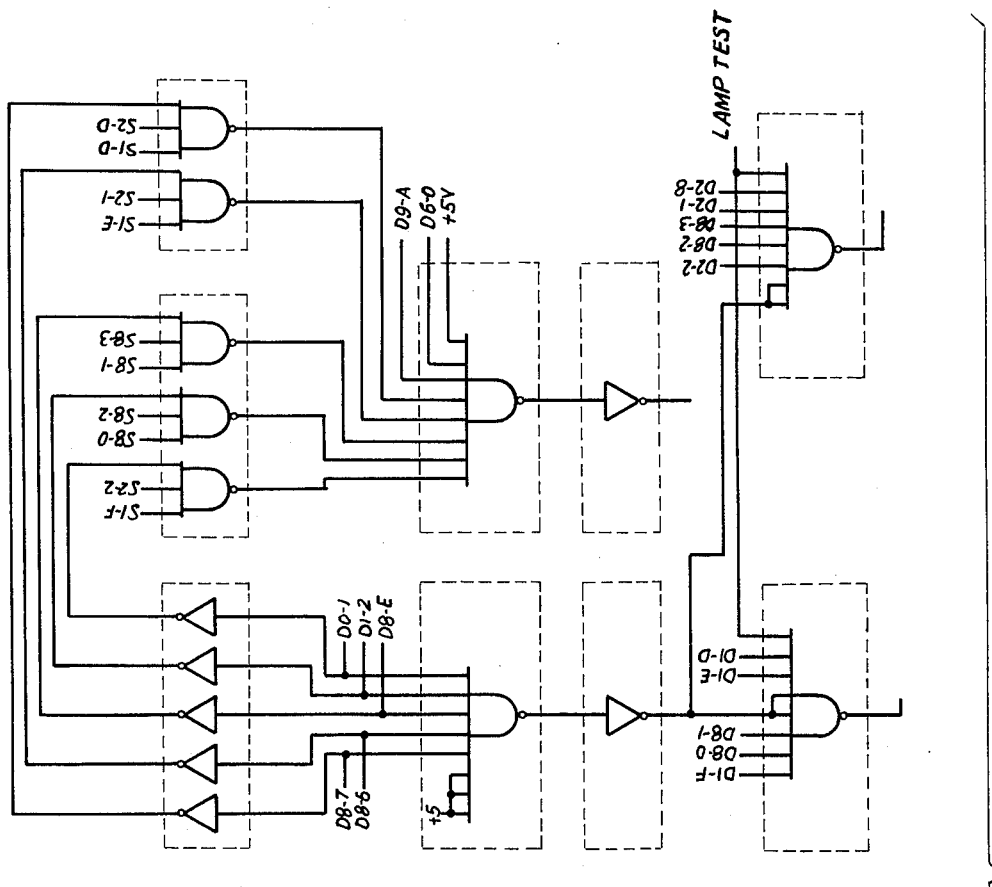
Figure 11:
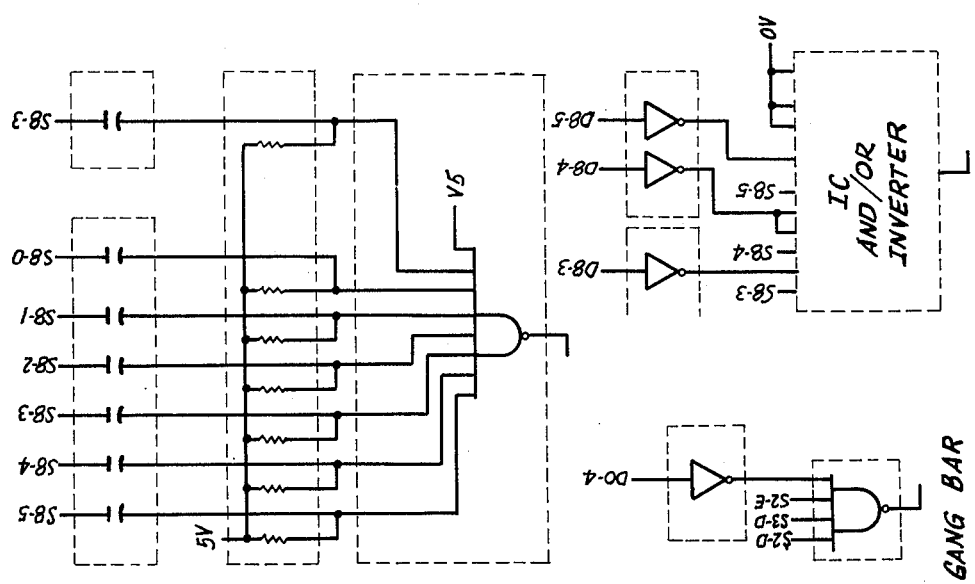
Figure 12:
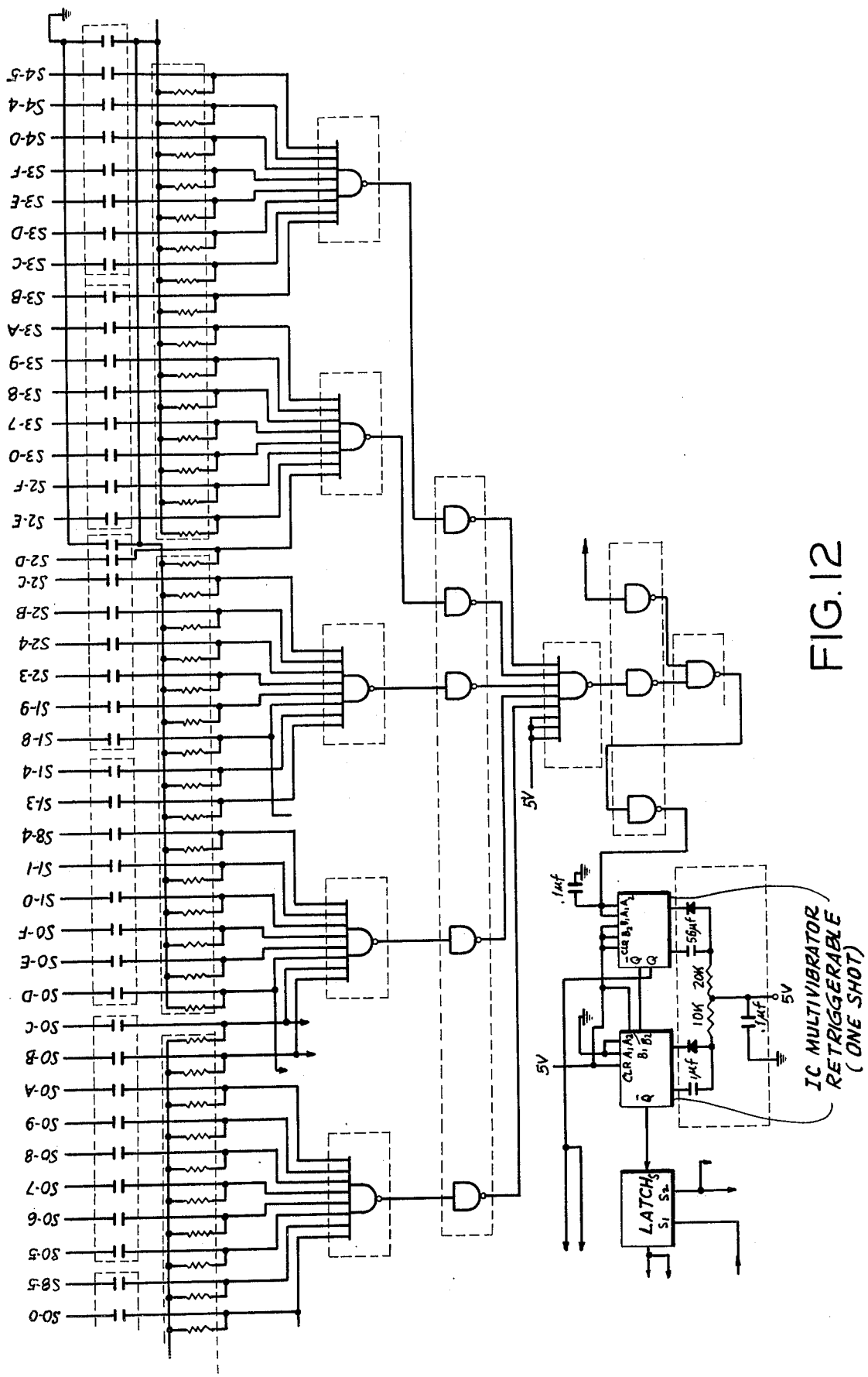
Figure 13:
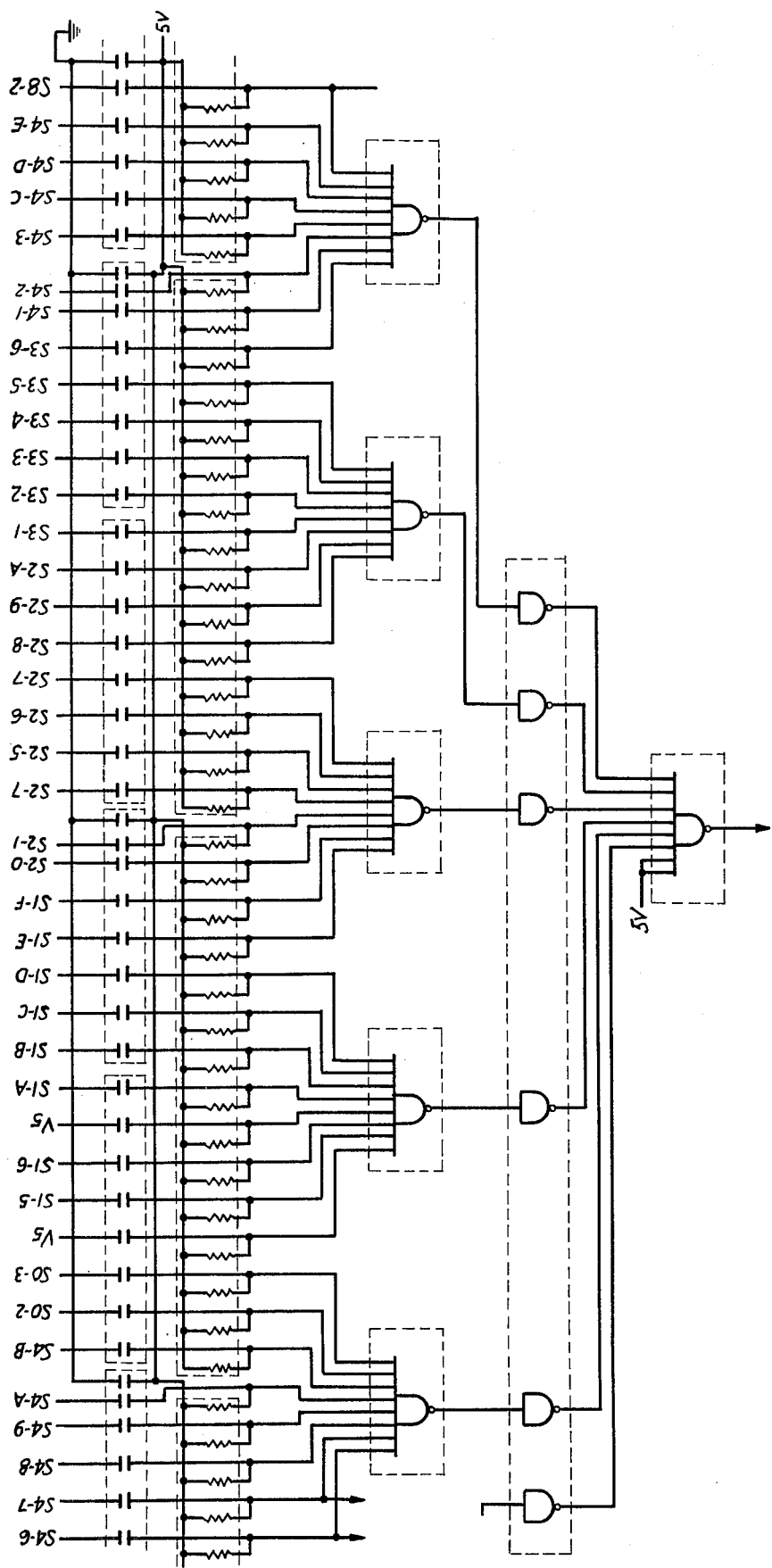
Figure 14:
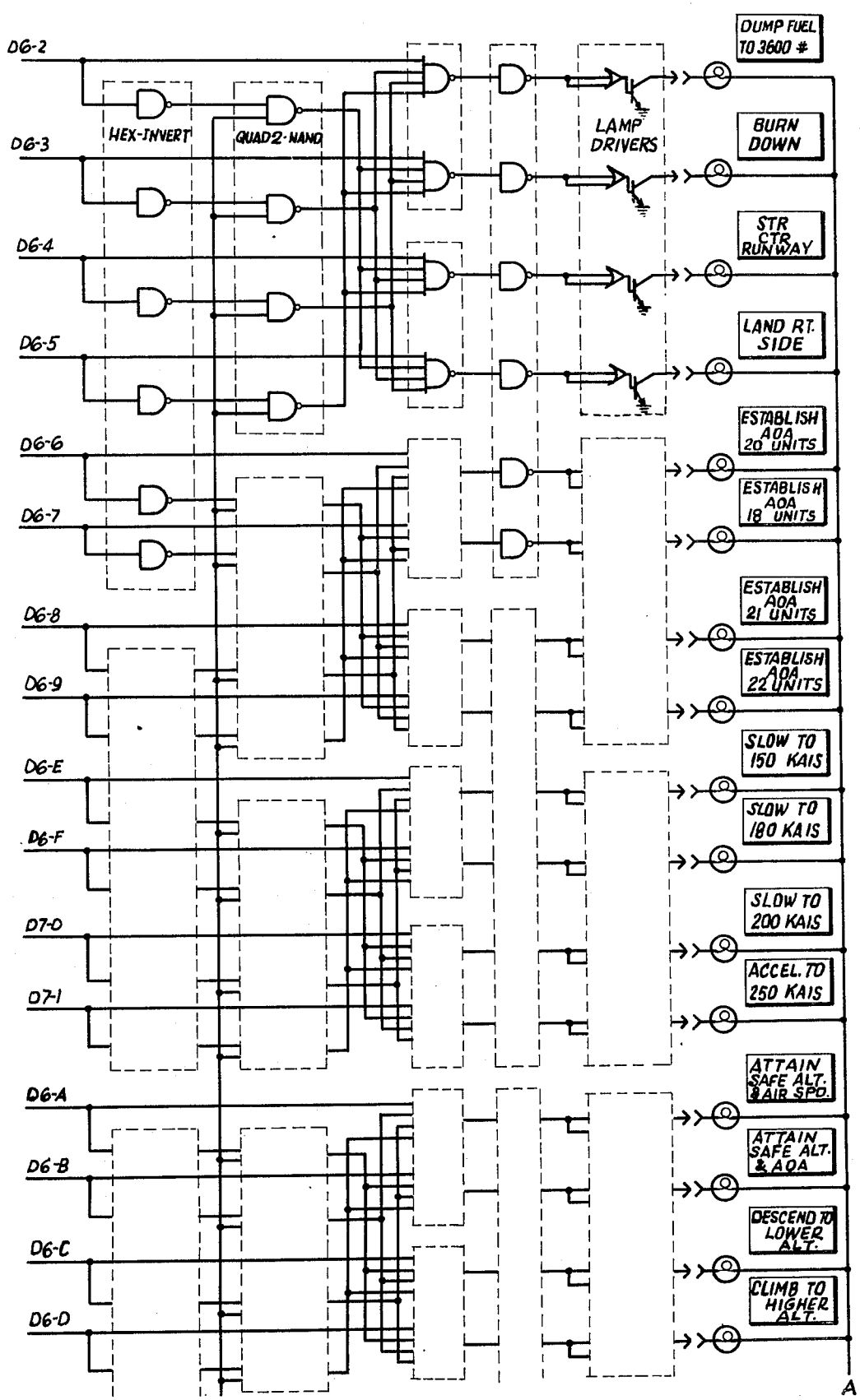
Figure 15:
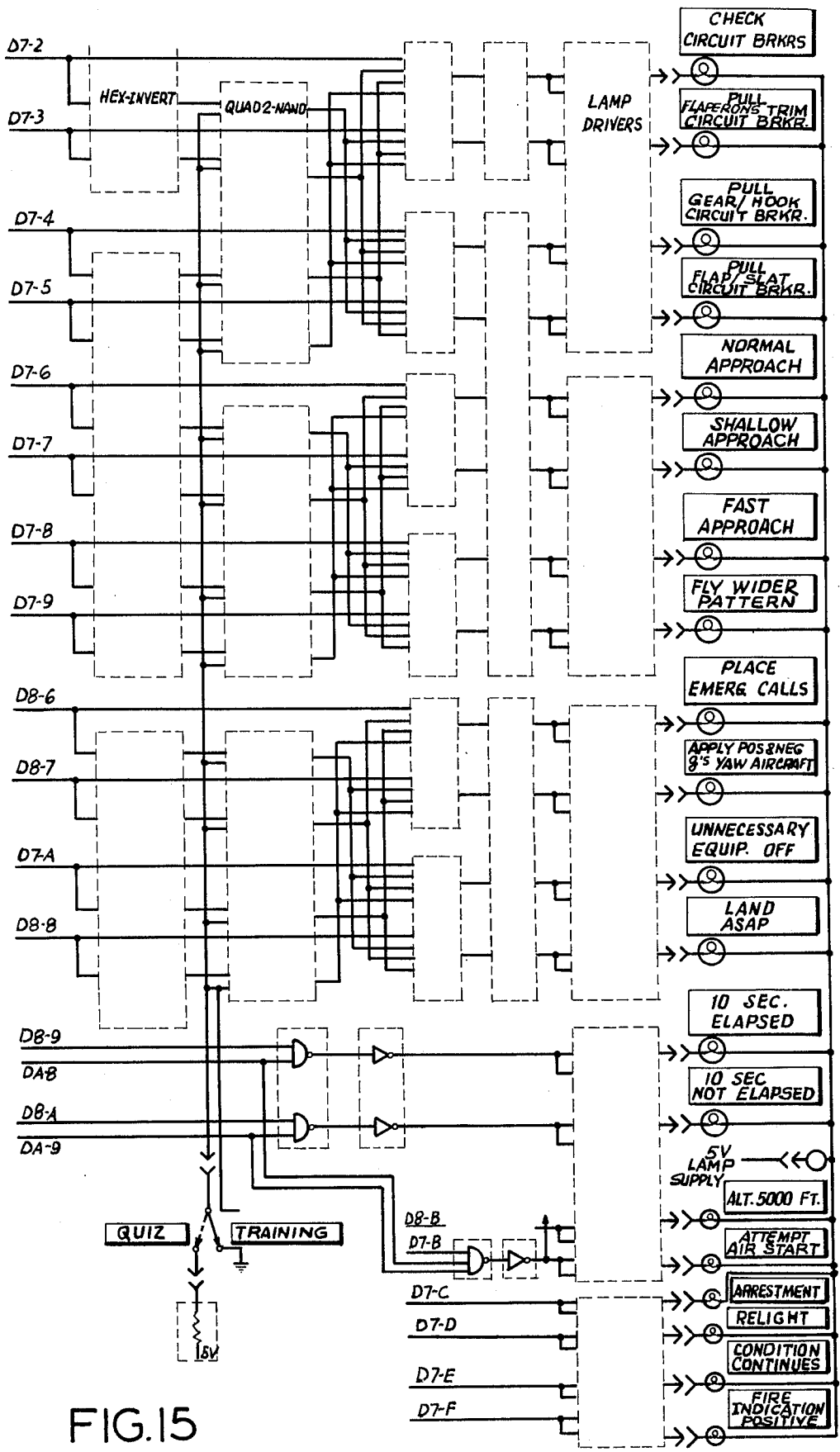
Figure 16:
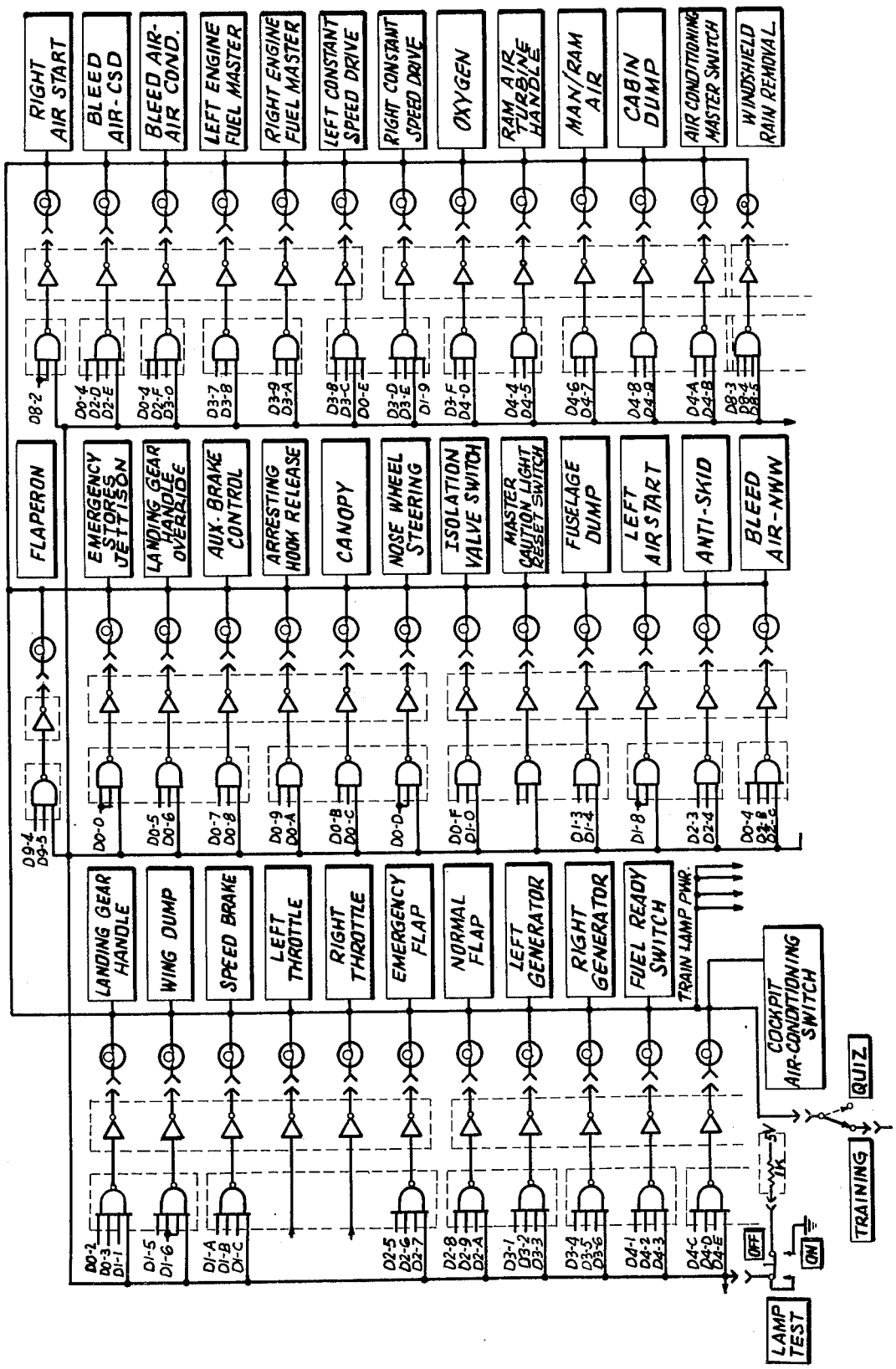
Figure 17:
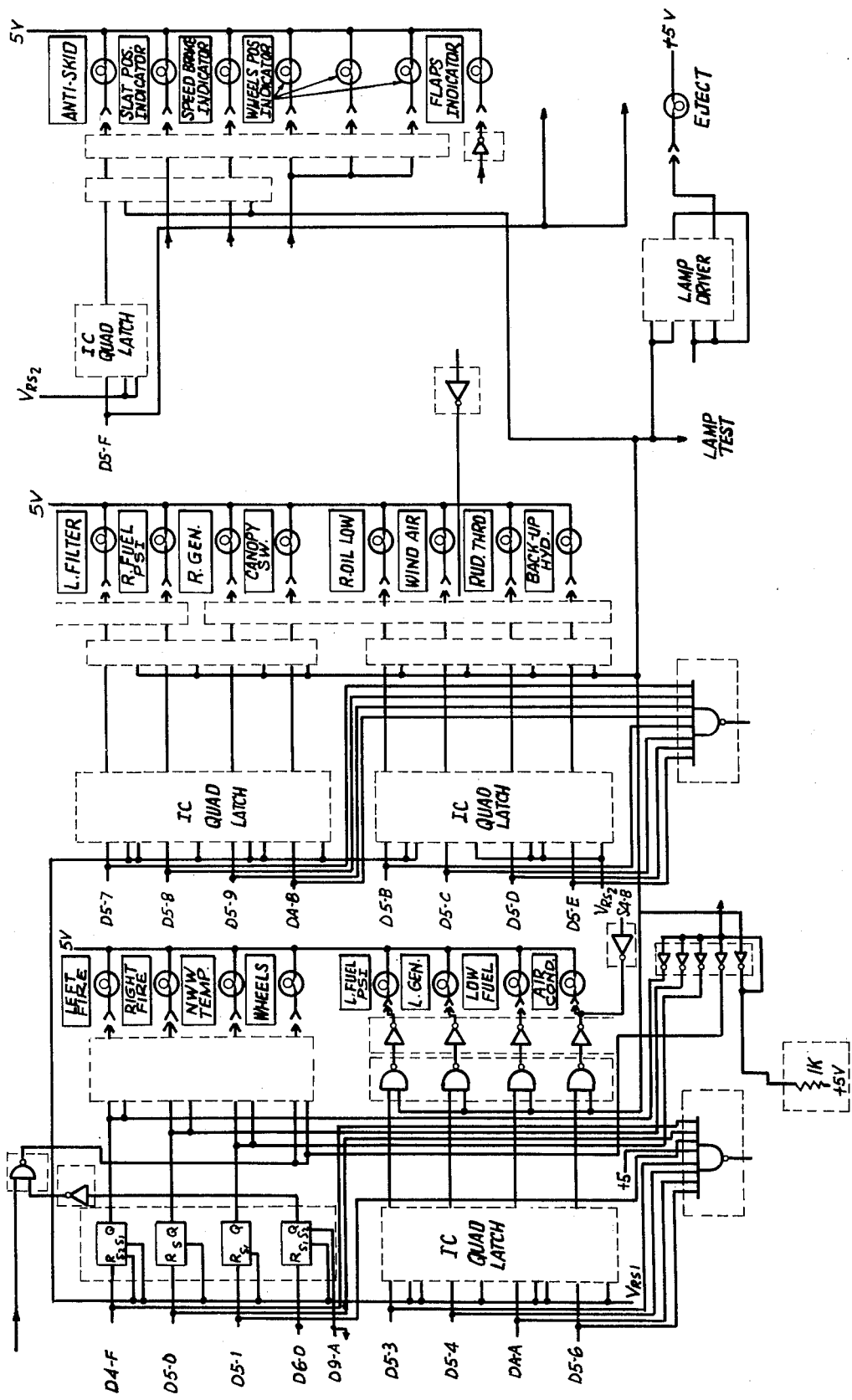
Figure 18:
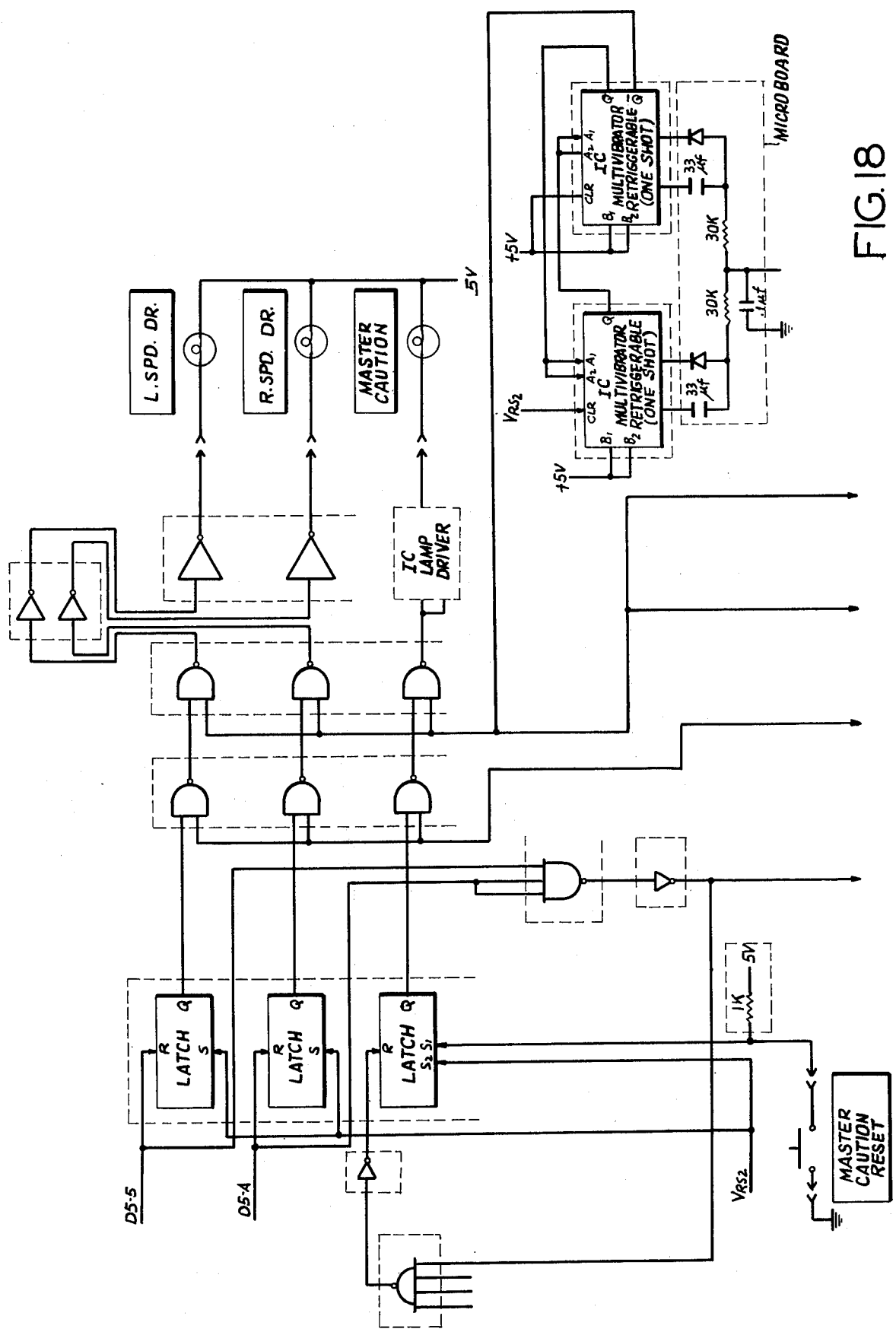
Figure 19:
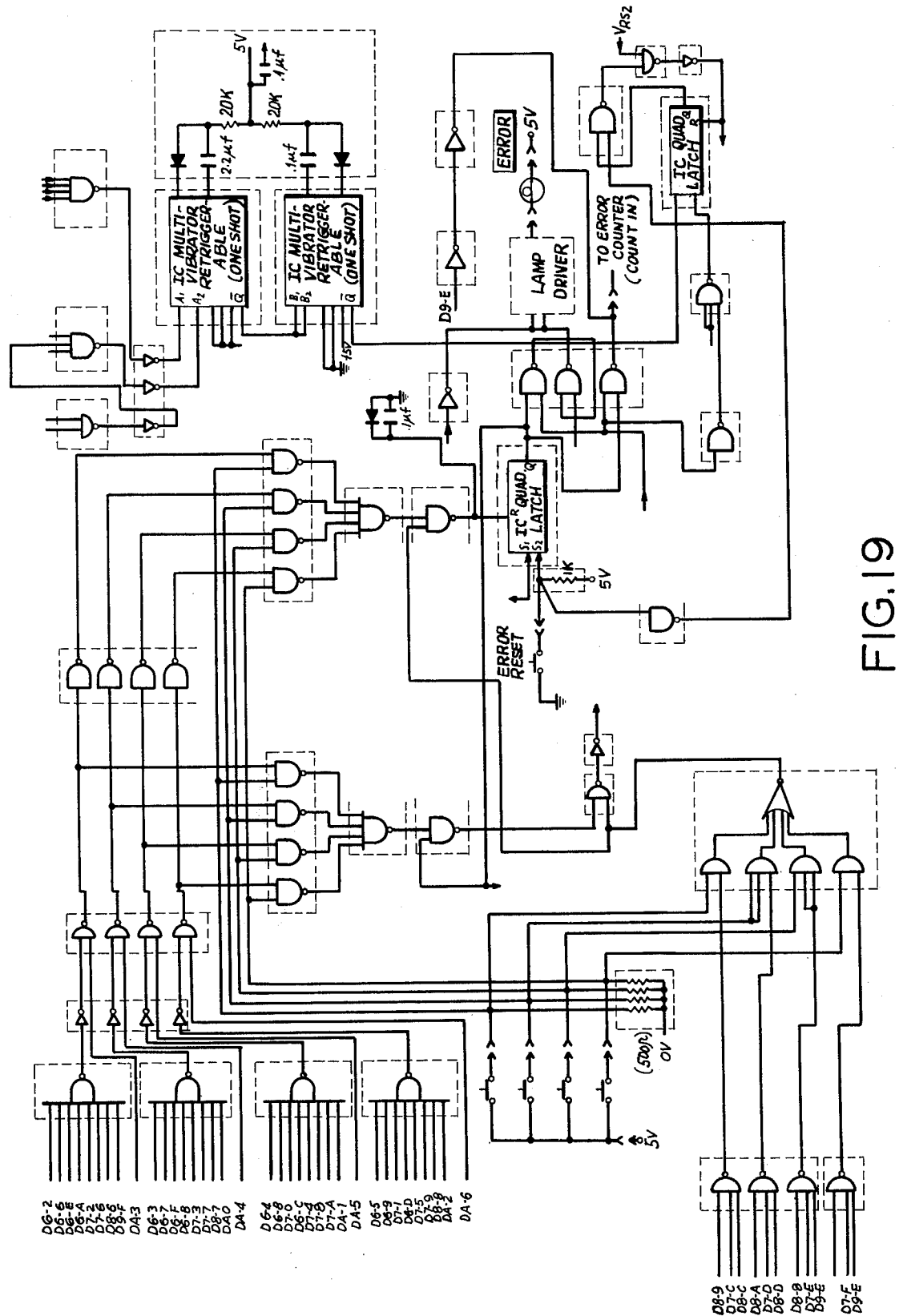
Figure 20:
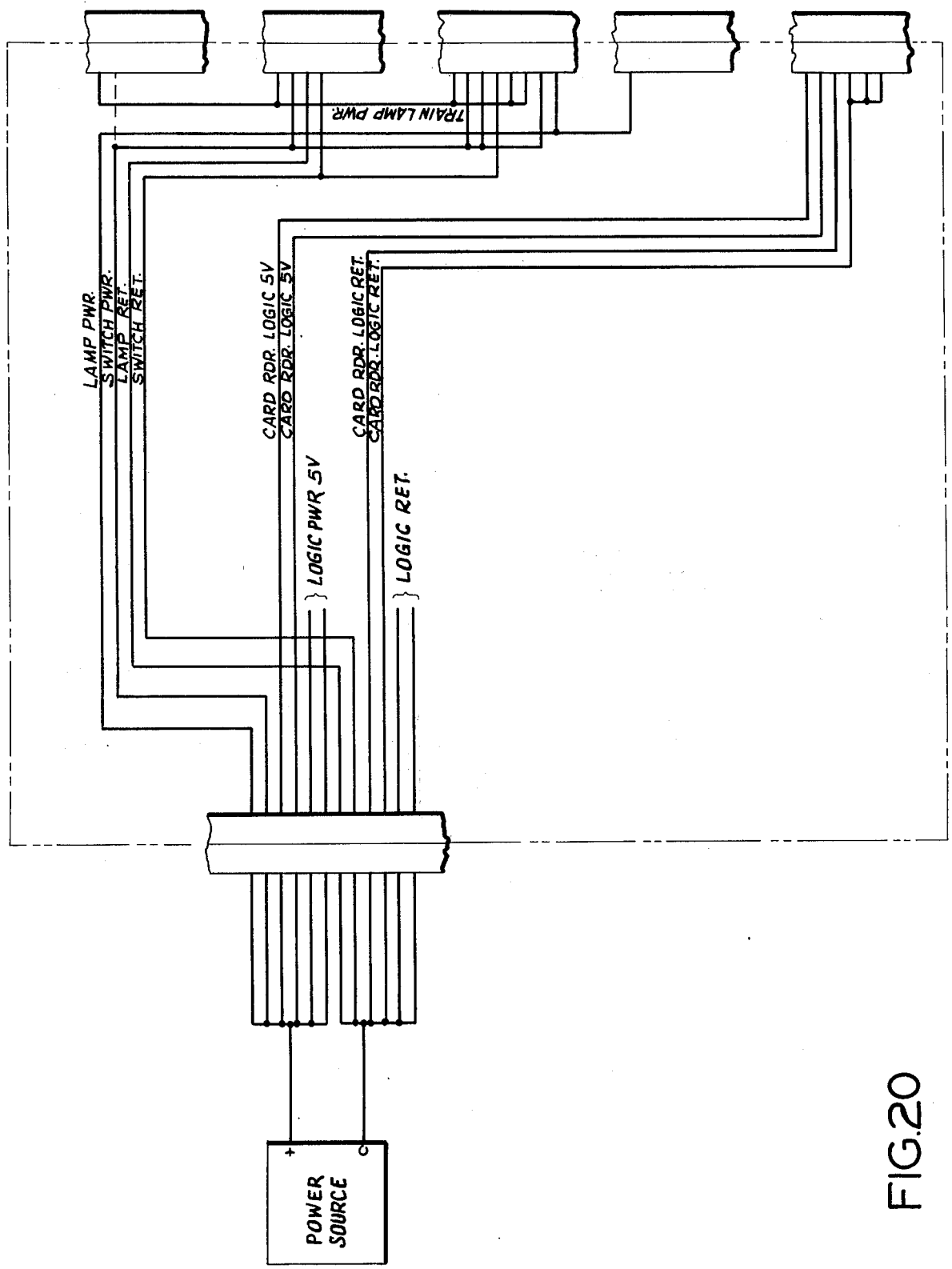
Figure 21:
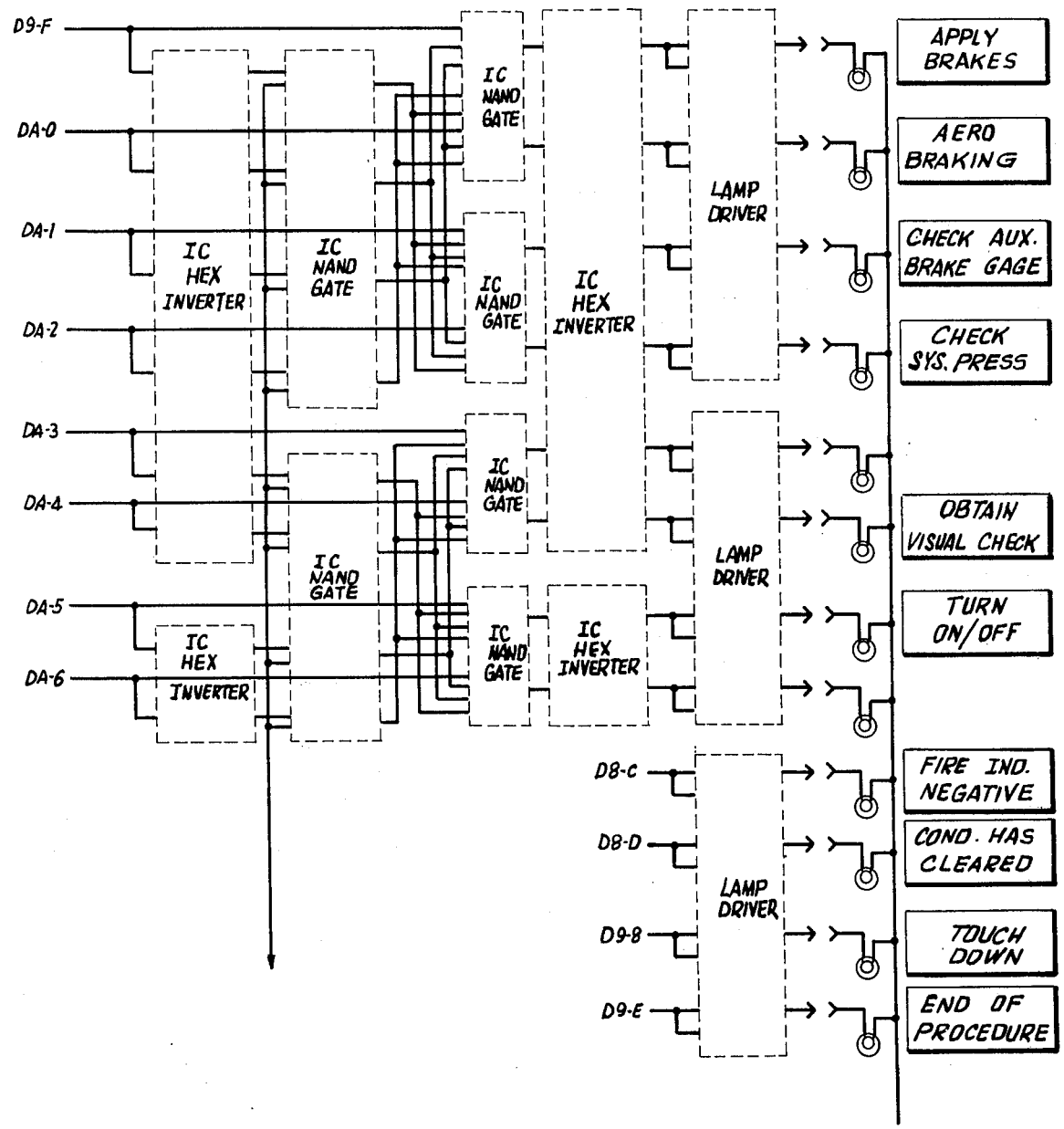
Figure 22:
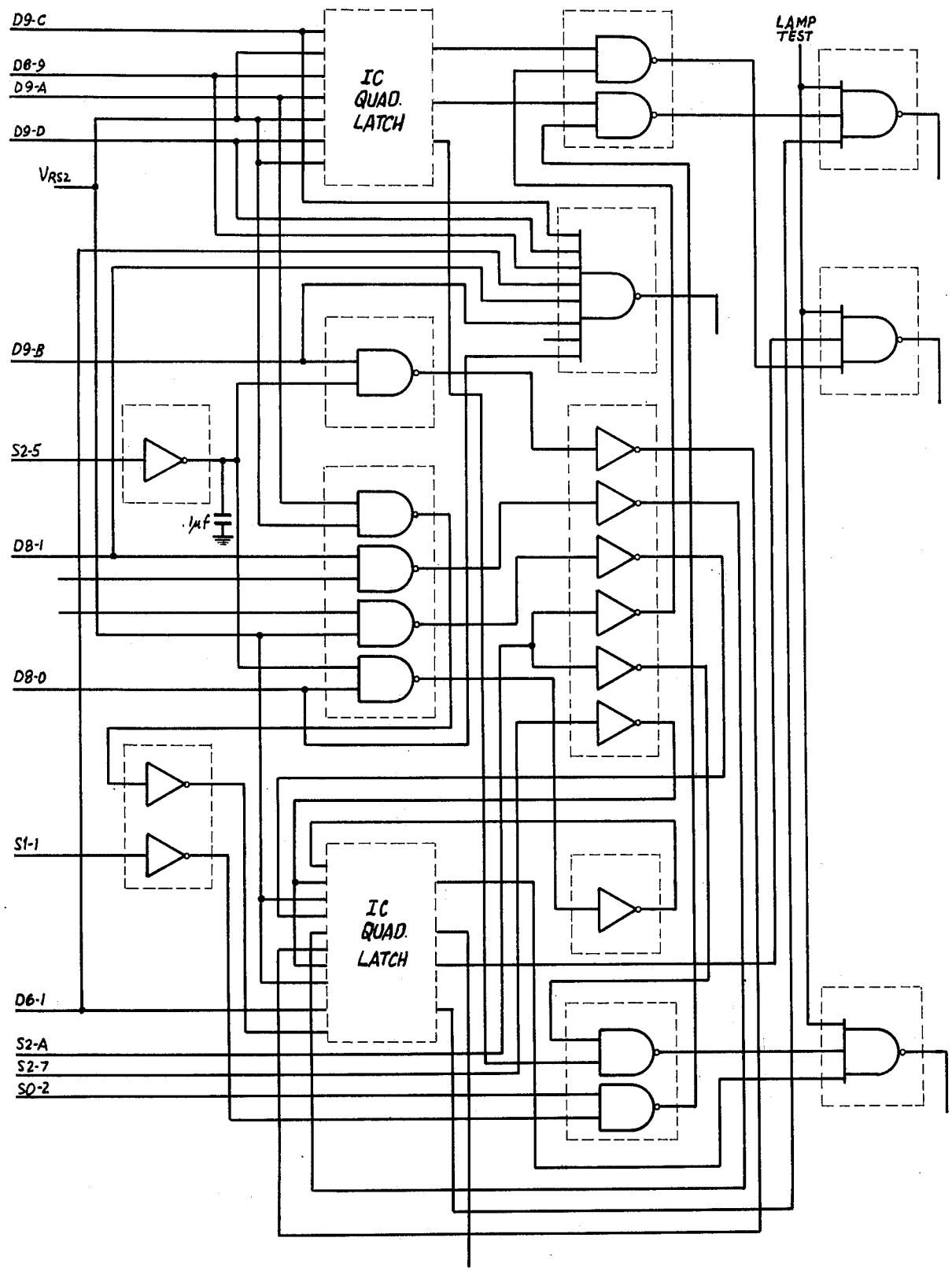

A logic diagram of the implementation of the coincidence detector 54 and scan pulse generator 40 is shown in FIG. 4. The logic elements are represented by conventional symbols and the integrated circuits illustrated by the blocks are commercially available from Texas Instruments, Inc., Dallas, Tex.

All coincidence pulses are summed by gate 112. When an acceptable pulse is generated, it is transmitted by gate 112 to the timing elements 114 and 116. These timing elements comprise the major section of the scan pulse generator 40. To avoid erroneous decoding a blanking signal is transmitted to the decoders while the scan pulse generator 40 is in transition from one column to another. If an error is made just prior to or just after an acceptable coincidence pulse, an error inhibit signal is sent to the timing elements 114 and 116 preventing a scan pulse from being transmitted from the scan pulse generator 40.

A complete electrical circuit diagram for the apparatus 10 is illustrated in FIGS. 5–22. Conventional symbols are used to illustrate the individual components. The integrated circuits illustrated by the blocks are commercially available from Texas Instruments, Inc., Dallas, Tex.

It should be understood by those skilled in the art that various modifications may be made in the present invention without departing from the spirit and scope thereof, as described in the specification and defined in the appended claims.

What is claimed is:

1. A portable apparatus for sequence training capable of use by a single operator, comprising:
    holding and momentary switches for activation by an operator;
    programming means for programming the apparatus to follow a particular training sequence requiring proper actuation of said holding and momentary switches;
    indicating means adjacent each of said holding and momentary switches for indicating which of said holding and momentary switches is to be activated by the operator in the training sequence;
    error recognizing means for recognizing activation of an improper one of said holding and momentary switches in the training sequence;
    manifesting means responsive to said error recognizing means for manifesting the activation of an improper one of said holding and momentary switches in the training sequence; and
    inhibiting means responsive to said error recognizing means for preventing further proceeding with the training sequence when an improper one of said holding switches is activated until the improperly activated holding switch is deactivated and said manifesting means is deactivated, and in the case of an improperly activated momentary switch, until said manifesting means is deactivated.

2. The apparatus recited in claim 1 wherein:
    said programming means includes a card reader and a plurality of program cards, said card reader being responsive to the program cards to establish a particular training sequence for said holding and momentary switches in the apparatus.

3. The apparatus recited in claim 1 wherein:
    said manifesting means includes an error light
    tabulating means including a counter for maintaining a record of the total errors committed during the training sequence.

4. The apparatus recited in claim 1 wherein:
    said error recognizing means includes a coincidence detector which receives input signals from said holding and momentary switches and said programming means for negating said inhibiting means upon coincidence of the input signals from said holding and momentary switches and said programming means.

5. The apparatus recited in claim 1 wherein:

said inhibiting means includes momentary switch compensator means for enabling the training sequence to proceed after activation of an improper momentary switch solely by deactivating said manifesting means.

6. The apparatus recited in claim 1, including:
mode means for selecting a train or quiz mode for the apparatus;
disabling means for preventing activation of said indicating means when said mode means is in the quiz mode.

7. The apparatus recited in claim 6 including:
timing means for recording the elapsed time for completion of the particular sequence in the quiz mode.

* * * * *